United States Patent
Coleman (10) Patent No.: US 8,889,013 B1
(45) Date of Patent: Nov. 18, 2014

(54) SYSTEM THAT PROVIDES ECONOMICAL PURIFICATION OF WASTEWATER AND RECIRCULATION OF POTABLE WATER AND GENERATION OF ELECTRICITY

(76) Inventor: William E. Coleman, Boulder, CO (US)

( * ) Notice: Subject to any disclaimer, the term of this patent is extended or adjusted under 35 U.S.C. 154(b) by 875 days.

(21) Appl. No.: 13/071,069

(22) Filed: Mar. 24, 2011

Related U.S. Application Data (63) Continuation-in-part of application No. 12/775,142, filed on May 6, 2010, now abandoned.

(51) Int. Cl.
C02F 1/04 (2006.01)
C02F 1/78 (2006.01)

(52) U.S. Cl.
USPC ........... 210/760; 210/764; 210/765; 210/766; 203/22

(58) Field of Classification Search
CPC ................ C02F 1/04; C02F 1/16; C02F 1/78; Y02E 20/14; Y02E 20/16; Y02E 50/11; Y02E 50/12; Y02E 50/30; F23B 7/00; F22B 27/16; F23G 5/40; F23G 7/001
USPC .......... 210/760, 764, 765, 766, 175; 110/219, 110/220, 224, 233, 234, 244, 341–348; 203/21–27; 48/197 A
See application file for complete search history.

(56) References Cited

U.S. PATENT DOCUMENTS 6,796,250 B1 * 9/2004 Greene .......................... 110/233

* cited by examiner

Primary Examiner — Lucas Stelling
(74) Attorney, Agent, or Firm — Duft Bornsen & Fettig, LLP (57) ABSTRACT

Water purification and recycling system that generates electricity and has a large reservoir and a small reservoir that provides potable water to a water user structure. After use by the water user structure, wastewater is applied from said water user structure via at least one wastewater path to wastewater treatment apparatus. The wastewater treatment apparatus receives and processes the wastewater using a power plant that operates continuously to produce steam. The wastewater treatment apparatus is also powered by a co-adjuvant gas turbine generator is adapted to generate supplemental steam for the power plant.

9 Claims, 6 Drawing Sheets

SYSTEM THAT PROVIDES ECONOMICAL PURIFICATION OF WASTEWATER AND RECIRCULATION OF POTABLE WATER AND GENERATION OF ELECTRICITY

RELATED APPLICATIONS

The patent application is a continuation-in-part of a U.S. non-provisional patent application Ser. No. 12/775,142 filed 6 May 2010 now abandoned and identically entitled, which is hereby incorporated by reference.

FIELD OF THE INVENTION

A wastewater treatment system having co-adjuvant power sources that process wastewater and re-circulates potable water from a water source to a water user.

BACKGROUND

Many cities and municipalities face increasing problems of obtaining potable water adequate for their needs. In the arid southwest portions of the United States, land is often not used because of a lack of water. Disputes can arise when a limited amount of water is shared by cities and agricultural areas. Some cities often limit their watering of lawns, golf courses, etc. A contributing factor to the worsening water shortage is that cities do little or nothing to improve the way their water is processed after use by the consumer.

Typically, this "wastewater" is sent to a sewage processing facility where it is "treated" and discharged into a river or the like where it flows downstream for other users.

Statement of the Problem

State-of-the-art wastewater processing facilities are not always inexpensive. Cost can be a major factor. There are a number of costs that must be considered when designing the type of wastewater system to be acquired.

The demand for wastewater processing facilities is not linear and includes time-wise variations since the use of these facilities is at its peak during daylight hours (when users generate more sewage) and is lower during evening hours (when users generate less sewage). This creates an uneven time wise demand for the level of service provided by wastewater processing facilities. Facilities designed and operated to produce electric power are diverse and use a variety of fuels such as coal, natural gas, diesel fuel, crude oil, and assorted bio-mass sources. The generating process begins with the combustion of fuel creating heat which converts water to steam which activates the generator. The byproduct from the generator is "waste steam" which is the energy source for the purification and recirculation process of the invention. The present invention constitutes a small continuously operating coal fired generating system and a co-adjuvant natural gas fired turbine generator/steam generating (combined cycle) system.

Statement of the Solution

A solution to the above problem is the provision of a recirculating type wastewater treatment system powered by a coal-fired power plant that is assisted by a co-adjuvant gas turbine generator that can generate steam on an as needed basis to supply supplemental steam for increased wastewater processing requirements. Both power plants include facilities that generate electricity that can be sold to nearby utilities.

The coal-fired power plant disclosed herein is operated continuously 24/7 to provide a steady low level of steam. This coal-fired power plant operates continuously to provide the steam needed during the late night hours. This steam can also generate electricity. After generating the electricity, the steam has less energy and is then referred to herein as waste steam. This remaining energy of the waste steam can also be used to supply the energy required for the purification of the received wastewater by the wastewater apparatus comprising the two preheat elements 214, 216, and the distillation elements 224 and 226 as well as other elements on FIG. 2 associated with the function of purifying the received wastewater and conveying the purified wastewater to reservoirs 266 in 268.

The co-adjuvant gas turbine generator may be dormant when the coal-fired power plant provides sufficient steam during low wastewater usage in the nighttime hours. The co-adjuvant gas turbine generator remains dormant until its output steam is needed to supplement steam from the coal fired power plant. Also, the coal-fired power plant uses the dried waste solids as fuel. The co-adjuvant gas turbine generator is controllably switched from an off state to an on state to generate the supplemental steam needed during busier daytime hours. The co-adjuvant gas turbine generator continues to operate as long as its supplemental steam is needed. The present embodiment of the invention provides the combined use of a coal-fired power plant and a co-adjuvant gas turbine generator for provision of the supplemental steam required for purification and processing of wastewater into potable water. It should be emphasized that coal-fired power plants also use the dried solids as fuels.

This combination of a coal-fired power plant and a co-adjuvant gas-fired turbine generator is advantageously used in accordance with an embodiment of the present invention to serve wastewater processing needs of a system having water storage facilities, wherein water is delivered by paths from a small and a large reservoir to a water user structure (such a home, house, business, commercial facility, etc).

Each water user structure is adapted to transport blackwater and greywater to water waste treatment apparatus served by the coal-fired power plant and co-adjuvant gas turbine generator.

A first water supply path delivers potable water from a small reservoir to a water user structure having sinks, bars and other facilities that dispense potable water to users. A second water supply path delivers water from a large reservoir to the water user structure for other water uses including showers, toilets, dish and clothes washers, etc.

A first wastewater discharge path conveys greywater from each water user structure to wastewater treatment apparatus that is adapted to convert the received greywater into potable water for discharge into the small reservoir.

A second wastewater discharge path conveys blackwater from each water user structure to wastewater treatment apparatus that is adapted to continuously convert the received blackwater into water of a quality suitable for discharge into the large reservoir.

The apparatus and methods embodied by this invention are economical, efficient, and effective because:

1. The amount of water required for cooking and drinking is small relative to the total water requirements of a water user structure.
2. The amount of wastewater leaving the water user structure that contains solids and bacteria is small compared to the total wastewater leaving the water user structure and which can be treated separately.
3. The coal fired power plant together with the co-adjuvant gas turbine generator provides the steam required to operate the wastewater processing system. The coal-fired power plant generates steam continuously defines an output level commensurate with the needs of water users during low usage night time hours. The co-adjuvant gas turbine generator is activated to generate supplemental steam during the daytime hours when the wastewater processing needs of the users increases.

4. The coal-fired power plant provides for combustion of the solid waste.

5. The use of activated carbon is an important part of the purification process. After use, the activated carbon is dried and disposed of as fuel in the coal-fired power plant.

6. The coal-fired power plant is adapted to generate ozone for use as part of the purification process.

7. As priorly mentioned, the apparatus embodying the present invention is adapted to generate electricity. The generated electricity may be sold to utilities on a contract basis. This would enable utilities to establish an operating presence in the areas proximate to the present system.

Aspects

One aspect of the invention comprises a system adapted to economically recycle water received from a water source and extended to a water user structure, said apparatus comprises: a first water supply path adapted to extend potable water from a small reservoir to said water user structure, a first wastewater path for conveying greywater from said water user structure to a wastewater treatment apparatus, a second water supply path adapted to extend water from a large reservoir to said water user structure, a second wastewater path extends blackwater comprising a mixture of solid waste and liquid waste from said water user structure to said wastewater treatment apparatus, said wastewater treatment apparatus being effective to treat said received blackwater and extends said treated blackwater as pure water to said large reservoir, wastewater treatment apparatus is powered by steam from a coal-fired power plant operating at a defined steam power output level as well as by steam from a co-adjuvant gas turbine generator to supplement the steam provided by the coal-fired power plant.

Preferably, said wastewater treatment apparatus comprises a continuously operating centrifuge adapted to receive said blackwater from the second wastewater path. This continuous mode of operation by the input waste material and by the centrifuge provides optimum operation wherein the centrifuge input contributes to an expedited operation of the system. The centrifuge separates the solid and liquid blackwater, the separated solid blackwater is applied to a dryer which dries the solid blackwater and conveys dried solid blackwater waste to be burned as fuel by the coal-fired power plant.

Preferably, liquid blackwater separated by said expedited centrifuge is applied to said wastewater treatment apparatus processes said separated liquid blackwater and extends it to a processing apparatus for extension to the large reservoir.

A second aspect comprises a method for recycling water received from a water source and extended to a water user structure, said method comprises the process steps of: extending potable water via a first water supply path from a small reservoir to a water user structure, applying greywater via a first wastewater path from said waste user structure to a wastewater treatment apparatus, extending water from a large reservoir via a second water supply path to said water user structure, conveying blackwater via a second wastewater path from said water user structure to said wastewater treatment apparatus, and processing greywater by said wastewater treatment apparatus for extension to the small reservoir, said wastewater treatment apparatus is steam powered by low-cost steam from a coal-fired power plant operating continuously 24/7 at a defined power output level and by steam from a co-adjuvant gas turbine generator, said co-adjuvant gas-fired turbine generator is adapted to operate to provide supplemental steam to said wastewater treatment apparatus in addition to a low-level of steam provided to said wastewater treatment apparatus by said coal-fired power plant.

DESCRIPTION OF THE DRAWINGS

The above and other aspects of the invention may be better understood from a reading of the following description thereof taken in conjunction with the drawings wherein:

FIG. 5 discloses a flow diagram illustrating the method of supplying steam to the wastewater processing apparatus of FIG. 2 by the coal fired power plant. FIG. 5 also discloses a flow diagram illustrating a method of supplying supplemental steam to the wastewater processing apparatus of FIG. 2 by a co-adjuvant gas turbine generator.

DESCRIPTION OF THE EMBODIMENTS

The figures and the following description illustrate specific exemplary embodiments of the invention. It will be appreciated that those skilled in the art will be able to devise various arrangements that, although not explicitly described or shown herein to embody the principles of the invention and are included within the scope of the invention. Furthermore, any examples described herein are intended to aid in understanding the principles of the invention, and are to be construed as being without limitation to such examples. As a result, the invention is not limited to the specific embodiments or examples described below, but only by the appended claims and their equivalents.

The terms blackwater and greywater as used in this document and shall be understood to be defined and characterized as follows. Blackwater shall be understood to characterize sewage containing human waste and or solid particles such as waste from kitchen disposals. Greywater shall be understood to characterize wastewater generated from activities such as laundry, dishwashing, showers, and bathing.

Figure 1:
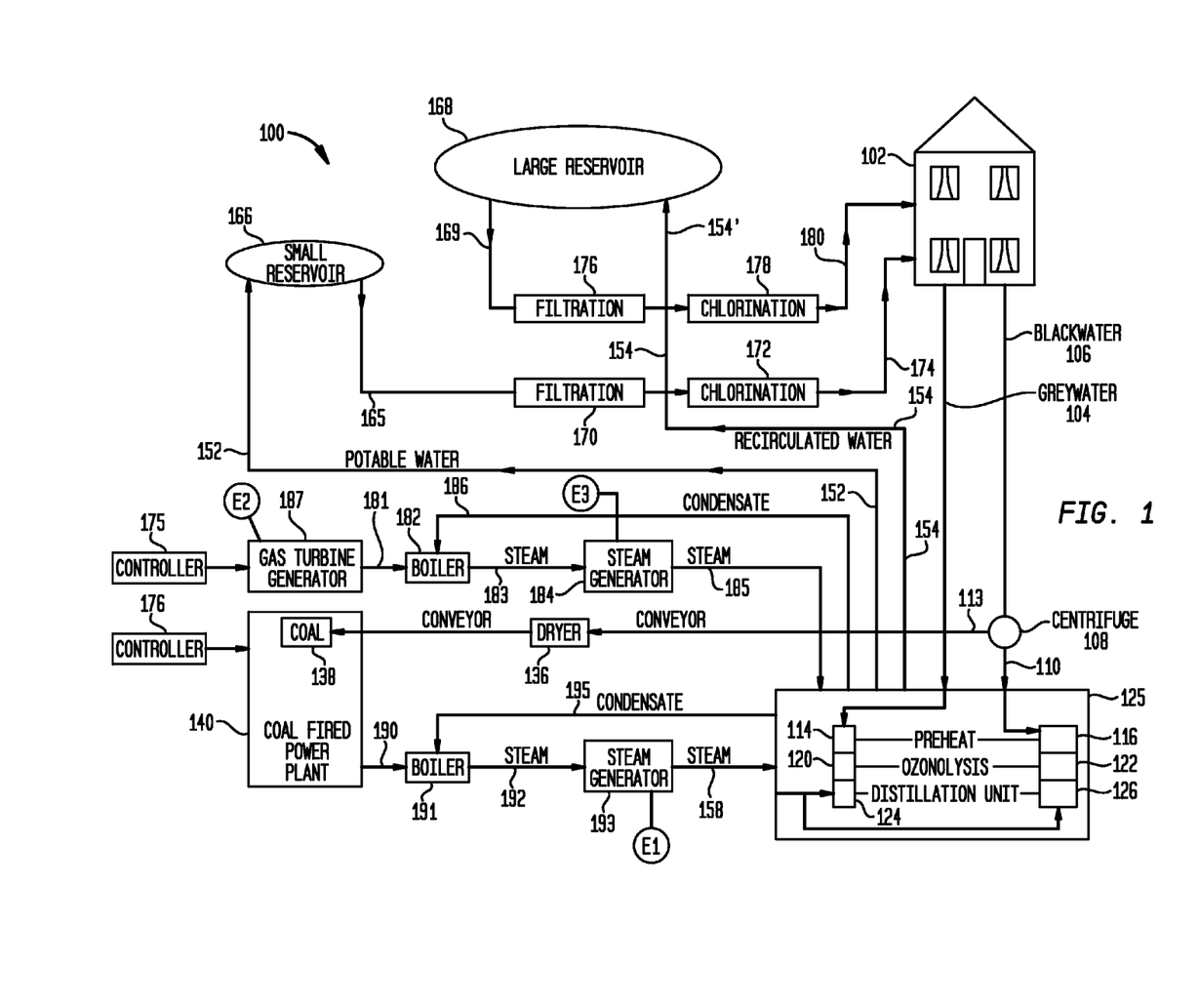
FIG. 1 discloses a block diagram description of an embodiment of the invention.

Description of FIG. 1

An embodiment of the invention includes water storage facilities comprising a small reservoir 166, a large reservoir 168, a treatment apparatus 125, and a coal-fired power plant 140 together with a co-adjuvant gas turbine generator 187.

Water is applied by path 165 from small reservoir 166 via filter 170, chlorination element 172, and path 174 to water user structure 102. This water is potable and is extended only to kitchen sinks, wet bars, etc. of water user structure 102 which supply potable water suitable for drinking and cooking for human consumption. Water user structure 102 is portrayed as a house. However, it may be a mixture of water user structures, such as houses, stores, apartment buildings or a mixture thereof.

Water from large reservoir 168 is extended via path 169, filter 176, chlorination element 178, and path 180 to water user structure 102. This water is provided to showers, garbage disposals, bathrooms, toilets, etc., which do not require potable water.

A pair of wastewater paths 104 and 106 extend from water user structure 102. Wastewater path 106 applies blackwater to centrifuge 108. Expedited centrifuge 108 separates solids from blackwater path 106 and extends the separated solids via path 113 to dryer 136. Dryer 136 dries the blackwater solids and applies them to coal 138 where they are mixed with coal 138 and subsequently burned in coal-fired steam power plant 140. The bacteria in the dried blackwater solids are burned by coal-fired steam power plant 140.

Expedited centrifuge 108 has a liquid blackwater output 110 which extends to preheat 116. Preheat 116 receives this liquid blackwater output 110 and extends it to ozonolysis mechanism 122 which uses ozone and the like to kill bacteria in the blackwater liquid waste received from preheat 116. Ozonolysis mechanism 122 applies its output to small distillation unit 126, which applies its distilled output via path 154 to large reservoir 168.

Preheat 114 receives greywater from liquid waste path 104 of water user structure 102. This greywater is applied via preheat 114 to ozonolysis mechanism 120 which applies its output to distillation unit 124. The output of distillation unit 124 is applied via path 152 to small reservoir 166.

Steam from coal-fired power plant 140 is applied via path 158 to distillation units 124 and 126. Most water in the distillation units 126 and 124 is distilled and returned via path 154 to large reservoir 168 and via path 152 to small reservoir 166. Distillation unit 124 and distillation unit 126 apply condensate 160 to boiler 191 of coal-fired power plant 140 via path 195 so that it can make more steam that is applied via path 158 to distillation units 124 and 126.

Coal-fired power plant 140 may be used to generate steam power and ultraviolet light. Embodiments of the invention burn carbon from the various filters as shown on FIG. 1. The carbon in the filters used by the embodiment of FIG. 1 is returned to the coal-fired steam power plant 140 along with the coal and is burned. Activated carbon is extremely effective to remove trace amounts of organics and the like. At the end of their useful life, the carbon filters may be burned by the coal-fired steam power plant as fuel.

Figure 2:
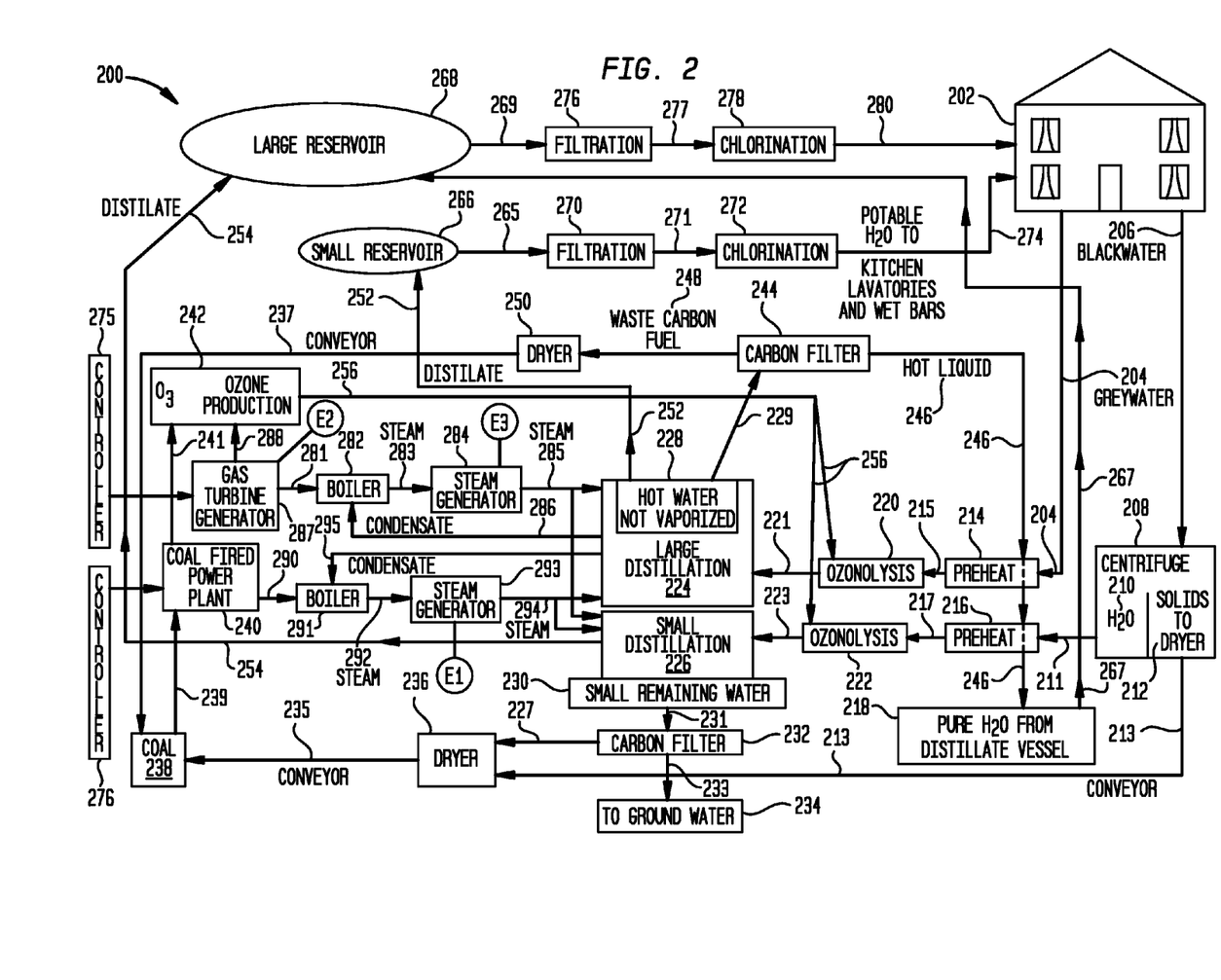
FIG. 2 discloses further details of the embodiment of FIG. 1.

The co-adjuvant gas turbine generator shown together with its associated elements in FIG. 1 comprises gas turbine generator 187 which applies its output over paths 181 to boiler 182 which generates steam as shown in greater detail on FIG. 2. The steam is applied over path 183 to steam generator 184 which similarly generates steam as described on FIG. 2. The steam generator 184 applies generated steam over path 185 to element 125 whose elements use the steam as described in greater detail on FIG. 2. The elements shown within wastewater processing element 125 receive the steam from coal-fired power plant 140 during the low usage night hours when only the coal-fired steam power plant 140 is operating to process wastewater of the system of FIG. 1.

As priorly described, co-adjuvant gas turbine generator 187 is operational together with the coal-fired steam power plant 140 during the daylight hours when the system of FIG. 1 and its customers require increased processing of wastewater.

As priorly described, the apparatus embodying the present invention is adapted to generate electricity which may be used by the system or sold to others, such as utilities. The apparatus that generates this electricity and distributes it for all off-site facilities for coupling the electric output of the generators to interface devices that are operable to apply the electricity from the generators to circuitry that extends to the off-site customer desiring to receive this electricity. This interface device is shown on FIG. 1 by a numbered designation such as E1, E2, and E3. On FIG. 1 interface E1 is coupled to steam generator 193 of the coal-fired power plant 140. Similarly, interface E2 is coupled to gas turbine generator 187 and similarly interface E3 is coupled to steam generator 184. These interfaces extend electricity to off-site customers. These interfaces E1, E2, E3 are shown on FIG. 2 as coupled to steam generator 293, gas turbine generator 287 and steam generator 284 for extending electricity from these devices to off-site customers.

Description of FIG. 2

The embodiment of FIG. 2 includes small reservoir 266, large reservoir 268, and wastewater treatment apparatus similar to that shown on FIG. 1 but is shown in greater detail in FIG. 2. FIG. 2 includes Coal-fired power plant 240 and associated apparatus as well as co-adjuvant gas turbine generator 287 together with associated apparatus generally shown on FIG. 1, but are shown in further detail on FIG. 2. Numbers in the 100 series on FIG. 1 are shown with a corresponding higher number in the 200 series on FIG. 2. For example, small reservoir 166 on FIG. 1 is designated as element 266 on FIG. 2.

Potable water is applied by path 265 from small reservoir 266 via a series connection of paths 265, filtration 270, chlorination unit 272, and path 274 to water user structure 202. This potable water is extended within water user structure 202 to kitchen sinks, wet bars, or any place which supplies potable water suitable for drinking, cooking, etc.

Water from large reservoir 268 is extended via path 269, filtration element 276, chlorination unit 278, and path 280 to water user structure 202. This water is provided within water user structure 202 to showers, garbage disposals, bathrooms, toilets, etc., which do not require potable water.

Path 206 transports blackwater from water user structure 202 to centrifuge 208 operating on an expedited basis. Element 212 of centrifuge 208 extracts the blackwater solids from path 206 and extends the extracted blackwater solids over path 213 to dryer 236. Dryer 236 dries the blackwater solids and applies them to path 235 to coal supply 238 where they are burned in coal-fired steam power plant 240. The bacteria in the blackwater solids are economically burned by coal-fired steam power plant 240.

Centrifuge 208 has a blackwater liquid wastewater output 210 which is applied via path 211 to preheat 216. Preheat 216 receives this blackwater liquid waste and extends it to ozonolysis mechanism 222, which kills the bacteria received in the blackwater liquid waste from preheat 216. Ozonolysis mechanism 222 receives ozone on path 256, kills the bacteria, and applies its output to small distillation unit 226, which distills water that is applied via path 254 to large reservoir 268.

The liquid input to preheat element 214 is the greywater received from liquid waste via path 204 from water user structure 202. This greywater is applied via preheat 214 to ozonolysis element 220, which receives ozone on path 256 to kill the bacteria and applies its output to large distillation unit 224. The output of large distillation unit 224 is applied via path 252 to small reservoir 266.

Preheater 216 heats the received blackwater liquid waste using hot water in path 246. Path 246 receives the hot water that originated in element 228 within large distillation unit 224. This hot water is not vaporized by the large distillation unit 224 and is received by the hot water unit 228 and applied over paths 229 to carbon filter 244 and, in turn, to path 246 which extends through preheat elements 214 and 216 to distillate vessel 218. Path 246 terminates in distillate vessel 218 which contains pure water generated by large distillation unit 224. Path 246 extends through preheat elements 214 and 216. The greywater and blackwater liquid within preheat elements 214 and 216 are thermally connected to the hot water within path 246. There is no integration of the hot water in hot water path 246 with blackwater liquid in the preheat elements 214 and 216. The hot water within distillate vessel 218 is extended over path 267 and discharged as potable water into large reservoir 268.

The output of coal-fired power plant 240 is applied via path 290 to boiler 291 which generates steam that is applied over paths 292 to generator 293 which generates further steam that is applied via path 294 to large distilization unit 224 and to small steam distilization unit 226. When co-adjuvant gas turbine steam generator 287 is operating, it applies its output to boiler 282 which applies its output over path 283 to turbine generator 284 which generates steam that is applied over path 285 to large distilization unit 224. The co-adjuvant gas turbine generator 287 is effective when operated to cause steam generator 284 to apply steam to large distilization unit 224 and small distilization unit 226. Most water in distillation units 224 and 226 is condensed. It can also be treated with ultraviolet light (not shown) before being returned via path 254 from small distilization unit 226 to large reservoir 268 and via path 252 from large distilization unit 224 to small reservoir 266. Distillation units 224 and 226 are steam powered by the steam received over path 294 from coal-fired steam power plant 240 via steam generator 293. Distilization units 224 and 226 also receive steam generated by gas turbine 287 via boiler 282 and steam generator 284 and path 285 when co-adjuvant gas turbine 287 is in operation.

Greywater in path 204 is preheated by preheat 214. This preheat element provides more time for processing of the received greywater waste by ozonolysis element 220. Some of this water is distilled by large distillation unit 224. It is advantageous to condense all of the steam that is generated by the coal-fired steam power plant 240 and co-adjuvant gas turbine generator 287. It is advantageous to use that energy required to condense this steam without using a cooling tower.

Ozone production element 242 receives electricity from coal-fired steam power plant 240 and from the co-adjuvant gas fired steam turbine generator 287 to make ozone. This ozone extends via path 256 to the inputs of ozonolysis element 220 and 222. The output of ozonolysis element 220 comprises pure oxygen that extends to large distillation unit 224. The output of the ozonolysis mechanism 222 is pure oxygen that extends to small distillation unit 226.

A small amount of water enters groundwater element 234 since there is not enough steam to distill all the water in each of distillation units 224 and 226. This small amount of water is applied through carbon filter 232 as groundwater 234. Periodically, carbon filter 232 is replaced and applied via dryer 236 to coal 238 for burning in coal-fired steam power plant 240

As priorly described with respect to FIG. 1, the designated interfaces E1, E2, E3 of FIG. 2 operates in the same manner to distribute electricity to off-site customers.

Figure 3:
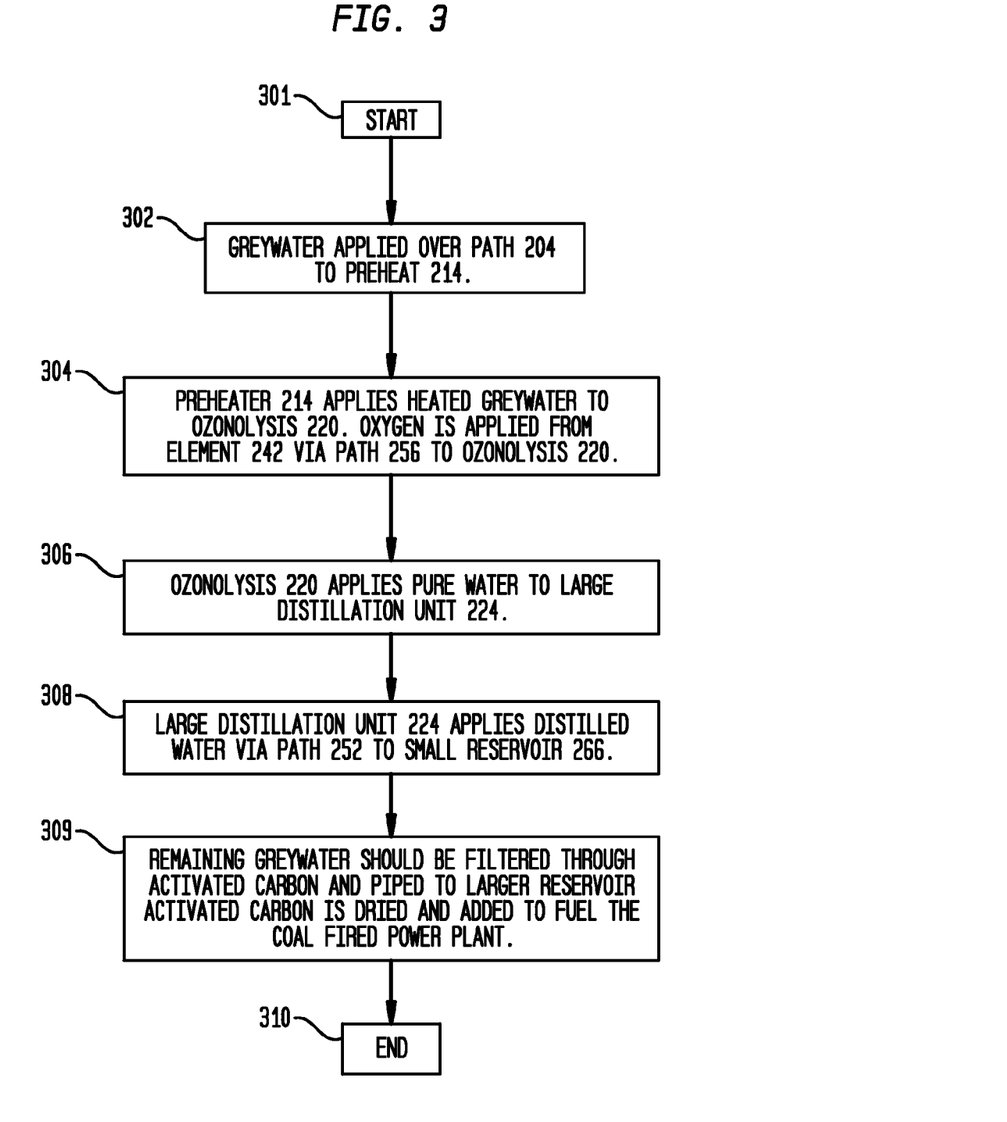
FIG. 3 discloses a flow chart illustrating a method of processing a greywater.

Description of FIG. 3

The flowchart of FIG. 3 illustrates a method by which apparatus of FIG. 2 processes the greywater. Step 301 is the start of the process. In process step 302, water user structure 202 applies greywater over waste path 204 to preheat 214. Preheat 214 applies heat to the received greywater to facilitate subsequent processing. In process step 304, preheat 214 applies heated greywater to ozonolysis element 220, which receives ozone from element 242. In process step 306, ozonolysis element 220 applies pure water to large distillation unit 224. In process step 308, large distillation unit 224 applies distilled water via path 252 to small reservoir 266. In Step 309 the remaining Greywater is filtered through activated carbon and piped to large to reservoir 168. Activated carbon is dried and added to the fuel of coal-fired power plant 240. Step 310 is the end of the process.

Figure 4:
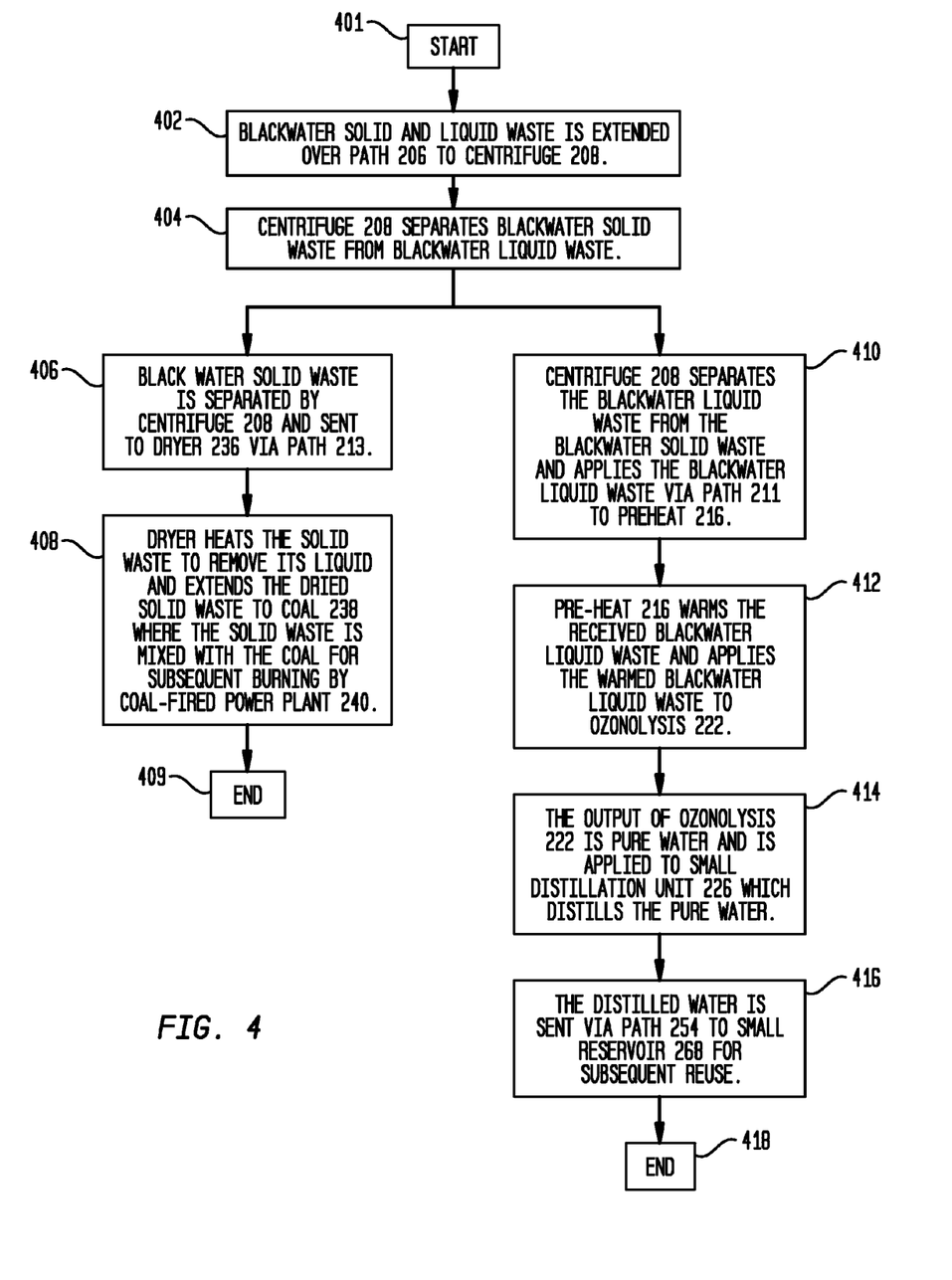
FIG. 4 discloses a flow chart illustrating the method of processing blackwater.

Description of FIG. 4

Step 401 is the beginning of the process. In process step 402, water user structure 202 generates blackwater that is extended via path 206 to expedited centrifuge 208. In process step 404, expedited centrifuge 208 separates blackwater solid waste from blackwater liquid. In process step 406, blackwater solid is separated by expedited centrifuge 208 and sent via path 213 to dryer 236. In process step 408, dryer 236 heats the solid blackwater waste to remove the liquid and applies the dried solid blackwater waste to coal 238, where the solid blackwater is mixed with coal for burning by coal-fired steam power plant 240. Step 409 is the end of the process in which solid blackwater is disposed of by burning coal.

Step 404 begins a process in which blackwater liquid is processed. In process step 410, expedited centrifuge 208 separates blackwater liquid from blackwater solid waste, and extends the blackwater liquid via path 211 to preheat 216. In process step 412, preheat 216 raises the temperature of the blackwater liquid to facilitate its processing. Preheat 216 applies its blackwater liquid to ozonolysis mechanism 222. In process step 414, the output of ozonolysis mechanism 222 is pure water since it receives ozone from element 242 via path 256. This ozone facilitates the operation of ozonolysis mechanism 222 in converting blackwater liquid into water. This water is applied to small distillation unit 226 which distills the water. In process step 416, distilled water is applied via path 254 to large reservoir 268 for subsequent use by water user structures 202. Step 418 is the end of the process which has received the blackwater liquid from expedited from centrifuge 208, processed the blackwater liquid and applied distilled water to large reservoir 268.

Figure 5:
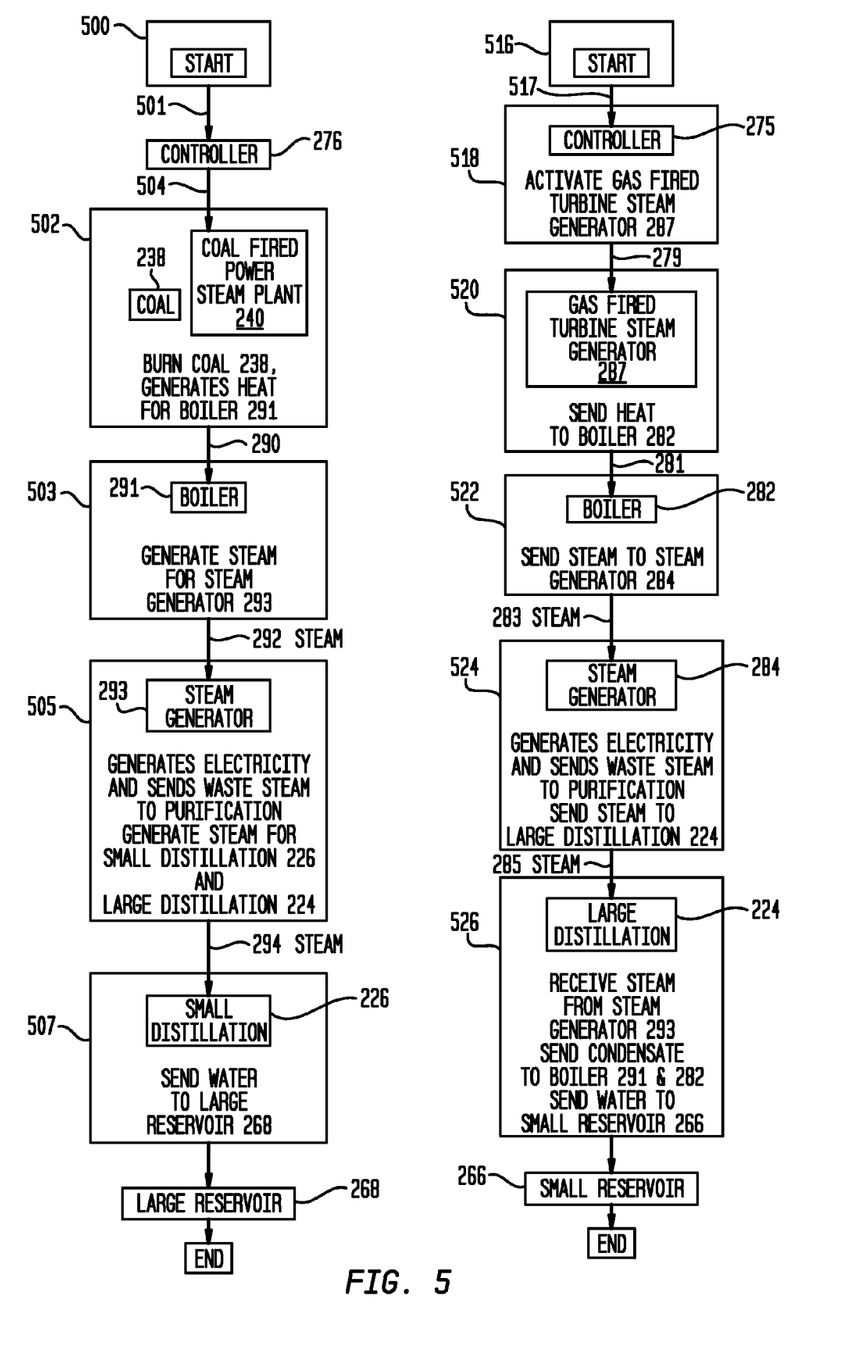

Description of FIG. 5

Figure 6:
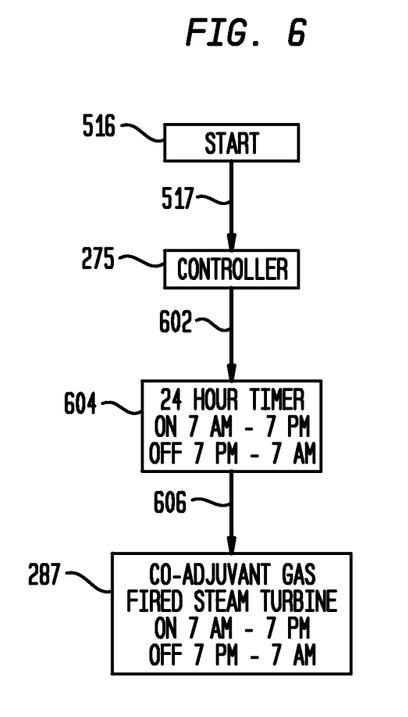
FIG. 6 discloses a flow diagram illustrating a method of determining the time of day at which the co-adjuvant gas turbine generator is activated by a controller. This controller is also effective to determine the time of day at which the co-adjuvant gas turbine generator is deactivated when the need for its supplemental steam is not required.

FIG. 2 taken in conjunction with flow charts of FIGS. 3, 4, and Flow Diagrams of FIGS. 5 and 6 illustrate the process steps by which the apparatus of FIG. 2 processes the wastewater received from a water user structure such as 202.

The left-column of FIG. 5 illustrates the process steps for the operation of coal-fired power plant 240. The right column of FIG. 5 illustrates the process steps for the operation of co-adjuvant gas fired turbine generator 287. These steam power plants together generate the steam required to process the received wastewater discharged by a water user structure 202.

The process steps for coal-fired power plant 240 begin with process step 500 of FIG. 5 which transmits start signals via path 501 and start element to controller 276. Controller 276 transmits signals via conductor 504 to coal-fired power steam plant 240 in process step 502. Process step 502 causes coal-fired power steam plant 240 to operate at a continuous rate and at a specified steam output. Also, in process step 502, coal-fired power steam plant 240 burns coal 238 and applies heat over path 290 to boiler 291 of process step 503. In process step 503, boiler 291 converts its input to steam which is applied to steam generator 293 in process step 505. Steam generator 293 functions as a steam turbine in process step 505 to apply steam via path 294 to small distilization unit 226 of process step 507. Steam generator 293 also generates electricity and sends waste steam to purification. The steam received by small distilization unit 226 is also applied to large reservoir 268 as END signal.

The steam of process step 505 is also applied to large distilization unit 224 of the right column, process step 526. In process step 526, the output of large distilization 224 is applied via small reservoir 268 to END signal of the right column of FIG. 5.

Coal-fired steam power plant 240 of FIG. 5 generates steam power during the daytime when wastewater processing needs are greater. The co-adjuvant gas-fired turbine generator 287 is activated at 7 AM to generate supplemental steam needed by the wastewater processing system of FIG. 2. This supplemental steam is generated by the process steps of the elements in the right column of FIG. 5.

The process steps for the operation of co-adjuvant gas fired steam turbine 287 begin with process step 516 and Start element at the top of the right column of FIG. 5. Start element 516 activates the process step 516 by sending a signal over path 517 to controller 275 in process step 518. Controller 275 receives signal 517 and generates signal 279 to activate co-adjuvant gas turbine steam generator 287 and generate supplemental steam in process step 520.

In process step 520, co-adjuvant gas turbine generator 287 generates heat and extends it over path 281 to boiler 282.

As shown on FIG. 2, boiler 282 receives water from large distilization element 224. Water used by boiler 282 in process step 522 is converted to steam by the heat received from co-adjuvant gas-fired turbine generator 287. Water is converted to steam by boiler 282 in process step 522 that is extended over path 283 to steam generator 284 in process step 524. Steam generator 284 functions as a gas turbine generator which generates further steam in process step 524.

This generated steam of process step 524 is applied to large distillation element 224. This steam generator also generates electricity and sends waste steam to purification. This also applies water to boiler 291 of the coal-fired steam power plant 240 to produce steam. As priorly mentioned, large distilization unit 224 also receives steam from steam generator 293 of coal-fired steam power plant 240. In process step 526, large distilization unit 224 also extends distilled water has shown on FIG. 2 to small reservoir 266. END step 266 ends the processing step for the co-adjuvant gas-fired turbine generator 287 on FIG. 5.

Those skilled in the technology to which the present invention pertains will appreciate that the disclosed wastewater processing system of FIG. 2 embodies complex apparatus that must be maintained to accommodate various system parameters such as: waste material weight, time of day, temperature of various elements, and pressure of various elements in order for the equipment to operate satisfactorily. Monitoring the system parameters is achieved by controller 275 which embodies a computer and software that monitors the system of FIG. 2 and its parameters.

Description of FIG. 6

FIG. 6 is a flow diagram illustrating processing of the TIME parameter by the present invention. This TIME parameter specifies how and when the co-adjuvant gas generator 287 is operated to generate supplemental steam. Coal-fired power plant 240 of FIG. 2 runs continuously 24/7 to generate a low-level of steam. This low-level of steam is adequate to operate the system during evening hours (7 PM-7 AM) when the demand for processing wastewater is relatively low. Coal-fired power plant 240 runs at the same low level during the day (7 AM-7 PM) when the demand for treating wastewater is higher. Since the coal-fired power plant 240 runs continuously; its steam output is adequate during evening hours to support wastewater processing; but it is not adequate during daylight hours when the demand for wastewater processing is high. The coal-fired power plant 240 then requires supplemental steam from the co-adjuvant gas turbine generator 287 to support adequate system operation.

Let it be assumed that the evening hours of operation are 7 p.m. through 7 a.m. and that daylight hours of operation are 7 a.m. to 7 p.m. The steam output from the coal-fired power plant 240 is adequate during the evening hours, and the assistance of supplemental steam from the co-adjuvant turbine generator 287 is not then required. However, the demand for wastewater processing is greater during the daylight hours, and the steam output of the coal-fired steam power plant 240 cannot support adequate system operation during the daylight hours. Adequate system operation during this time may require availability of the output of the coal-fired power plant 240 together with the supplemental steam from the co-adjuvant gas turbine steam generator 287.

FIG. 6 illustrates the following apparatus embodying the invention including: start element 516, path 517, path 602, and controller 275 are shown on both FIGS. 5 and 6; path 602, path 606, and 24 hour timer 604 are shown on FIG. 6; and the co-adjuvant gas turbine generator co-adjuvant gas and turbine steam generator 287 is designated as being active during the daylight hours of 7 AM through 7 PM, and is designated as being off during the evening hours of 7 PM through 7 AM. Element 275 is a controller. Timer 604 is programmable to specify the same daylight hours and evening hours for co adjuvant gas turbine generator 287. These hours are for illustrative purposes only.

This process begins when the system operator activates start key 516. Start key 516 is shown in greater detail in the right column of FIG. 5. The activation of start key 516 extends a signal from start key 516, over path 517 to controller 275 which may comprise a computer and/or appropriate software. The operator of the system may operate the system of FIG. 6.

The system operator may initiate automatic operation by operating controller 275 to apply a control signal over path 602 to timer 604. Timer 604 generates signal 606 to initiate automatic operation of the co-adjuvant gas-fired turbine generator 287 to begin successive operational periods beginning when an initial signal is first applied to path 606 by timer 605. Timer 605, after first applying signal to path 606, causes the co-adjuvant gas-fired turbine generator 287 to begin operations as determined by the operator and controller 275.

The above operations are merely illustrative since controller 275 is a computer-controlled software device and may be programmed to operate as specified by the system operator and controller 275 of FIG. 6 to apply a control signal over path 602 to timer 604. Timer 604 generates signal 606 to initiate automatic operation of the whole adjacent gas turbine generator 287 to begin successive operational periods beginning when an initial signal is first applied to path 606 by timer 604. After applying signal path 606 to causes the gas-fired turbine generator 287 to begin operations as determined by the operator and controller 275.

Controller 275 and co-adjuvant gas turbine generator 287 are adapted to monitor the wastewater processing system to determine whether the system that is operating as specified by the TIME parameter. Other parameters may also be monitored by controller 275 and appropriate software. This system can also monitor other system parameters including for example; wastewater temperature and weight; steam temperature; oxygen level, ozone production, carbon filter blockage, etc. The monitoring of the system and its parameters facilitates improved service of the system to its users and customers.

Epilogue

The scope of the invention shall be broadly construed as permitted by any reasonable interpretation disclosed and claimed herein. The invention is described with reference to the use of multiple bodies of water referred to as a "large reservoir and a small reservoir". Those of ordinary skill will readily appreciate that the manner in which the invention is practiced is not dependent upon the size of the bodies of water. The use of the term "small and large body of water, rather than the use of "a first and a second body of water, facilitates ease of understanding.

The invention does not require multiple bodies of water of which one is large and other of which is small. As long as sufficient size and water volume exists, it does not matter whether one body is large and the other body is small, or weather both are equal. Also, the applicant's invention could be practiced if sufficient large bodies of water are available. The invention could be practiced if only a large or only a small number of small bodies are available.

Also, the bodies of water do not have to be outdoor reservoirs. The bodies of water could be storage tanks which, when properly configured, could serve the same water storage function. The same comments may be made with regard to the structure to which water is delivered. This document refers to structures that use water as "water user structures". Each water user structure could be a home or a plurality of homes, or one or more buildings, or apartments in a housing complex, or could be one or more garages, industrial structures, or any mixture of industrial, commercial or residential structures having a use for water.

The invention is described herein with regard to the use of any power plant and associated co-adjuvant gas turbine. The invention is not limited to coal or co-adjuvant turbines and may be operationally associated with any type of power plant including water, wind, solar, gas or nuclear.

It should be understood that applicant's invention may be practiced with a single body of water when greywater is processed as described. Blackwater liquid is processed in the same manner as described. The blackwater solids are disposed of as described, or could be distributed to farmers or agricultural uses. However, facilities must be provided to burn the carbon filters to provide electricity.

In view of the above, the scope of applicant's invention shall be as limited to and defined by applicant's disclosure taken in conjunction with his claims.

What I claim is:

1. A method for recycling water between a water source and a water user structure, said method comprises the process steps of:
   extending potable water from said water source to said water user structure;
   applying wastewater from said water user structure to a wastewater treatment apparatus;
   operating said wastewater treatment apparatus to process received wastewater as greywater and blackwater for extension as the potable water to said water source;
   applying steam to said wastewater treatment apparatus from a coal-fired power plant; and
   applying supplemental steam to said wastewater treatment apparatus from a co-adjuvant gas turbine generator.

2. The method of claim 1 further comprising the process steps of:
   treating said received blackwater; and
   extending said treated blackwater as the potable water to a first reservoir.

3. The method of claim 1 further comprising the process steps of:
   operating said co-adjuvant gas turbine generator intermittently to apply supplemental steam to said wastewater treatment apparatus in addition to the steam provided to said wastewater treatment apparatus by said coal-fired power plant, wherein said wastewater treatment apparatus is adapted to apply electricity to users including users not served by said water treatment apparatus.

4. The method of claim 1 wherein:
   said wastewater treatment apparatus is effective to receive and to treat blackwater, and further includes an apparatus that processes said treated blackwater as the potable water and extends said treated blackwater to a first reservoir, wherein said wastewater treatment is further effective to receive and treat greywater and convey said treated greywater to a second reservoir for subsequent use by said water user structure.

5. The method of claim 1 further comprising the process steps of:
   operating said wastewater treatment apparatus to receive said wastewater comprising liquid greywater and blackwater for processing and storage as the potable water.

6. The method of claim 1 further comprising the process steps of:
   applying wastewater from a first wastewater path to a preheater coupled to an ozonolysis element; and
   extending an output of said ozonolysis element to a first distillation apparatus which processes said output of said ozonolysis element and applies a processed output of said first distillation apparatus as the potable water to a second reservoir.

7. The method of claim 6 further comprising the process steps of:
   operating said first distillation apparatus and a second distillation apparatus by steam from the coal-fired power plant; and
   operating said first distillation apparatus and said second distillation apparatus to return spent steam as condensate to said coal-fired power plant and said co-adjuvant gas turbine generator.

8. The method of claim 1 further comprising the process steps of:
   applying steam from said coal-fired power plant to an ozone production apparatus; and operating said ozone production apparatus for applying oxygen to an ozonolysis element for use by said wastewater processing apparatus.

9. The method claim 1 further comprising the process steps of:
operating a first distillation apparatus to apply distilled hot water via a path including a first and a second preheater to a vessel for receiving pure distilled water;
said distilled hot water heats said preheaters;
said distilled hot water is thermally connected to said preheaters while not being co-mingled with liquid waste in said preheaters; and
discharging said distilled hot water in said vessel to a first reservoir.

* * * * *